(12) United States Patent
Chen

(10) Patent No.: US 7,063,105 B1
(45) Date of Patent: Jun. 20, 2006

(54) STRUCTURE FOR A WATER INLET AND OUTLET OF A FAUCET VALVE BASE

(76) Inventor: Mei-Li Chen, No. 1-2, Lane 73, Sec. 2, Jhongshan Rd., Tanzih Township, Taichung County (TW)

( * ) Notice: Subject to any disclaimer, the term of this patent is extended or adjusted under 35 U.S.C. 154(b) by 21 days.

(21) Appl. No.: 10/948,645

(22) Filed: Sep. 24, 2004

(51) Int. Cl.
*F16K 11/074* (2006.01)

(52) U.S. Cl. .................................. 137/625.17

(58) Field of Classification Search ........... 137/625.41, 137/625.17
See application file for complete search history.

(56) References Cited

U.S. PATENT DOCUMENTS

| | | | | |
|---|---|---|---|---|
| 4,243,063 A | * | 1/1981 | Parkison | 137/100 |
| 5,095,934 A | * | 3/1992 | Iqbal | 137/270 |
| 5,329,958 A | * | 7/1994 | Bosio | 137/269 |
| 5,331,997 A | * | 7/1994 | Bosio | 137/270 |
| 5,806,552 A | * | 9/1998 | Martin, Jr. | 137/270 |
| 5,853,023 A | * | 12/1998 | Orlandi et al. | 137/271 |
| 6,640,357 B1 | * | 11/2003 | Chang | 4/675 |

\* cited by examiner

*Primary Examiner*—John Fox
(74) *Attorney, Agent, or Firm*—Egbert Law Offices

(57) ABSTRACT

The improved structure for the water inlet and outlet of faucet valve base has a partially setting horizontal partition membrane in the cold and warm water inlets and the outlet, and reduces their size. Since there is some distance between the partition membrane and the top and the bottom of the inlets as well as outlet, the water can change its running direction. This can make the outlet direction of the outlet closer to the outlet channel of the valve groove of the faucet. Therefore, the length of the outlet channel can be effectively reduced and another water extension channel between the outlet of the valve base and the outlet of the faucet is not required. This can make it easier to be manufactured, reduces the cost, and decreases environmental pollution.

2 Claims, 6 Drawing Sheets

STRUCTURE FOR A WATER INLET AND OUTLET OF A FAUCET VALVE BASE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a faucet, and more particularly to a faucet which comprises improved structure for the water inlet and outlet of the valve base.

BACKGROUND OF THE INVENTION

As shown in FIG. 7, the faucet valve base 40 of a cold and hot water faucet has cold and hot water inlets 41 42, and the outlet 43 for mixed water. The inlet and outlet of above mentioned valve base 40 are generally of direct vertical structure and the water moves vertically without change of direction. The outlet 43 of the current valve base 40 is positioned at the rear part of the valve base and the outlet 51 of the valve groove 501 of the faucet 50 is near the hot or cold-water inlets 41 42 of the valve base 40.

Therefore, a water extension channel is required between the outlet 43 of the valve base 40 and the outlet 51 of the faucet 50. However, since the extension channel 512 might overlap the inlet channels of cold and warm water of the faucet 50, they should be put at a different height. This makes it more difficult to mould the faucet, increases its size and cost, and brings more pollution.

Therefore, an ideal and practical structure is called for in this field.

BRIEF SUMMARY OF THE INVENTION

This invention can change the positions of cold and warm water inlets 11 12 as well as the outlet 13 of the valve base 10 with a partition membrane without changing the internal structure of the valve base. This can make the outlet direction of the outlet 13 closer to the outlet channel 33 of the valve groove 301 of the faucet 30 (refer to FIG. 6). Therefore, the length of the outlet channel 33 can be effectively reduced and another water extension channel between the outlet of the valve base and the outlet of the faucet is not required. Furthermore, it would not overlap with the cold and warm water inlet 31 32. The outlet 13 of the valve base 10 can change the outlet position, making it closer to the outlet channel 33 of the valve groove 301 of the faucet 30. This can make it easier to be manufactured, reduces the cost, and decreases environmental pollution.

The above is a detailed description of the technical features of this invention. Any adjustment and revision of this invention should be subject to the invention and within the scope prescribed by the patent.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
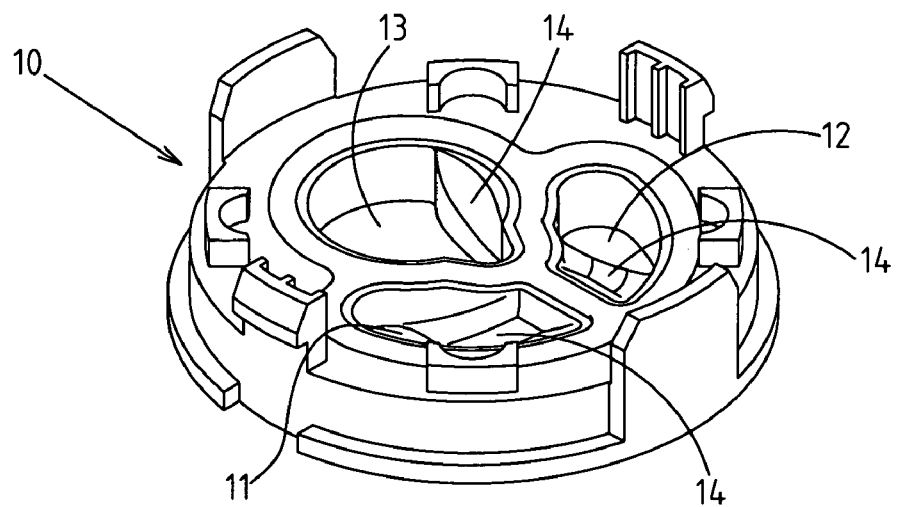
FIG. 1 shows an upper perspective view of the valve base.
Figure 2:
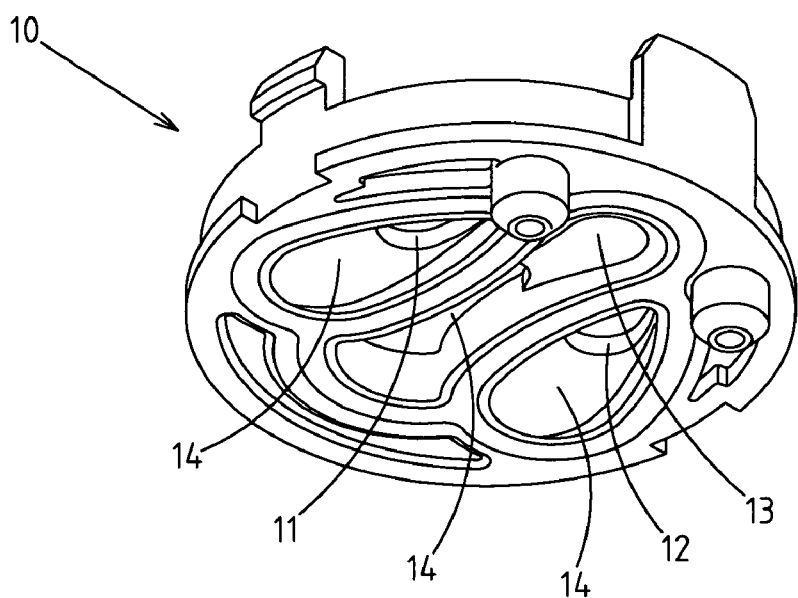
FIG. 2 shows a bottom perspective view of the valve base.
Figure 3:
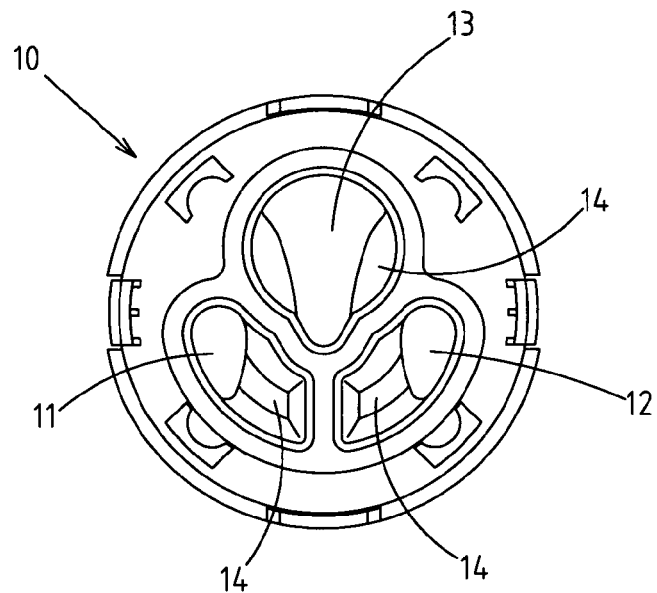
FIG. 3 shows a top plan view of the valve base.
Figure 4:
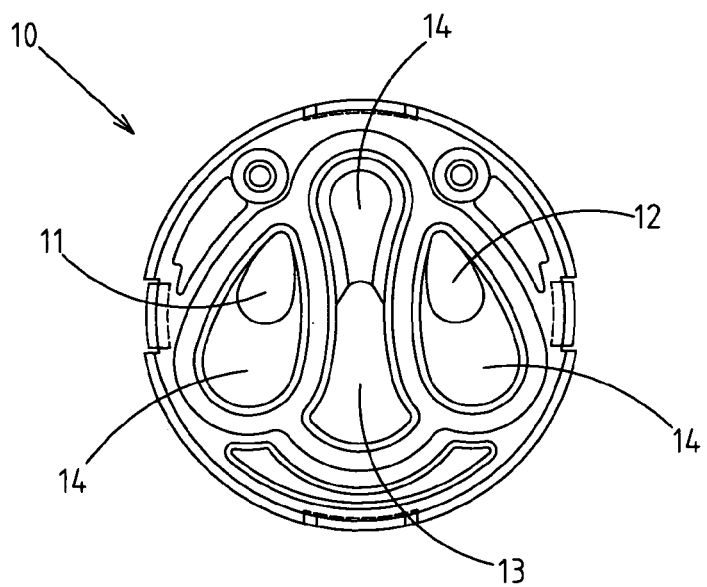
FIG. 4 shows a bottom view of the valve base.
Figure 5:
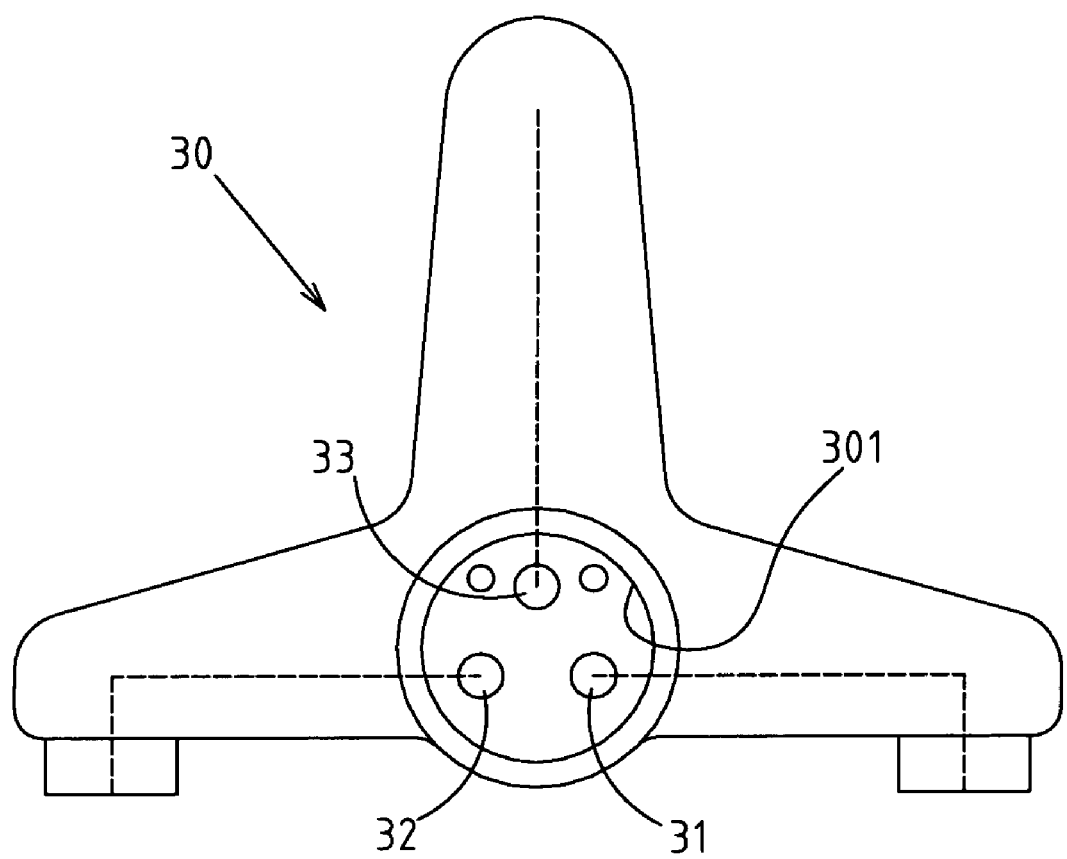
FIG. 5 shows a bottom view of the outlet and valve groove.
Figure 6:
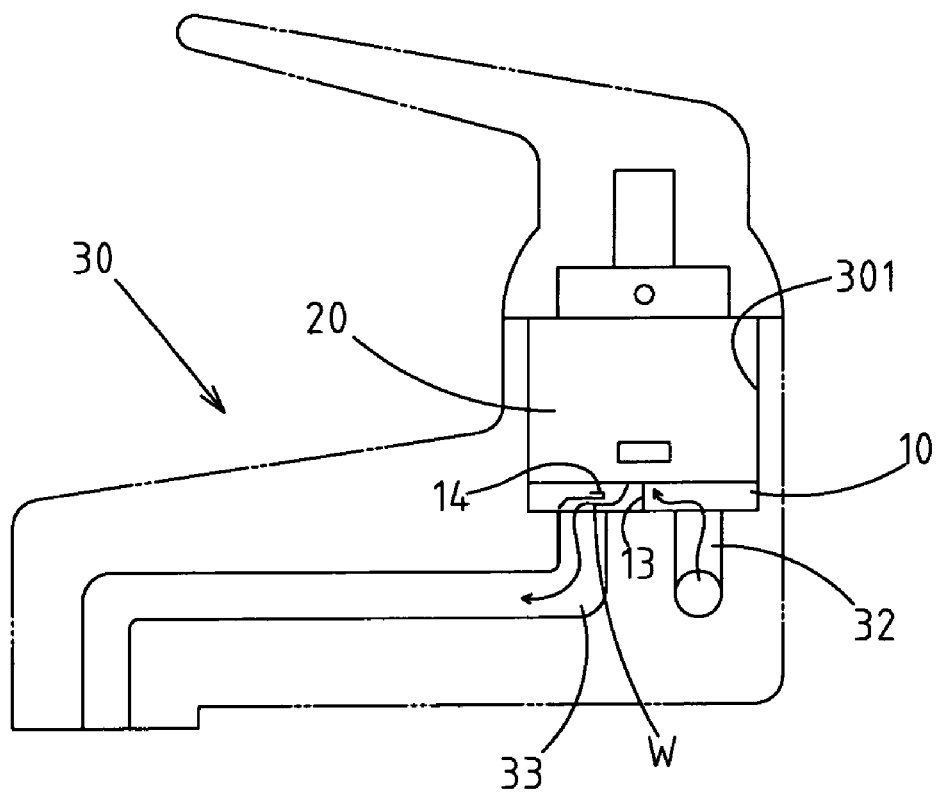
FIG. 6 shows side sectional view of the installation of the valve base to the valve groove.
Figure 7:
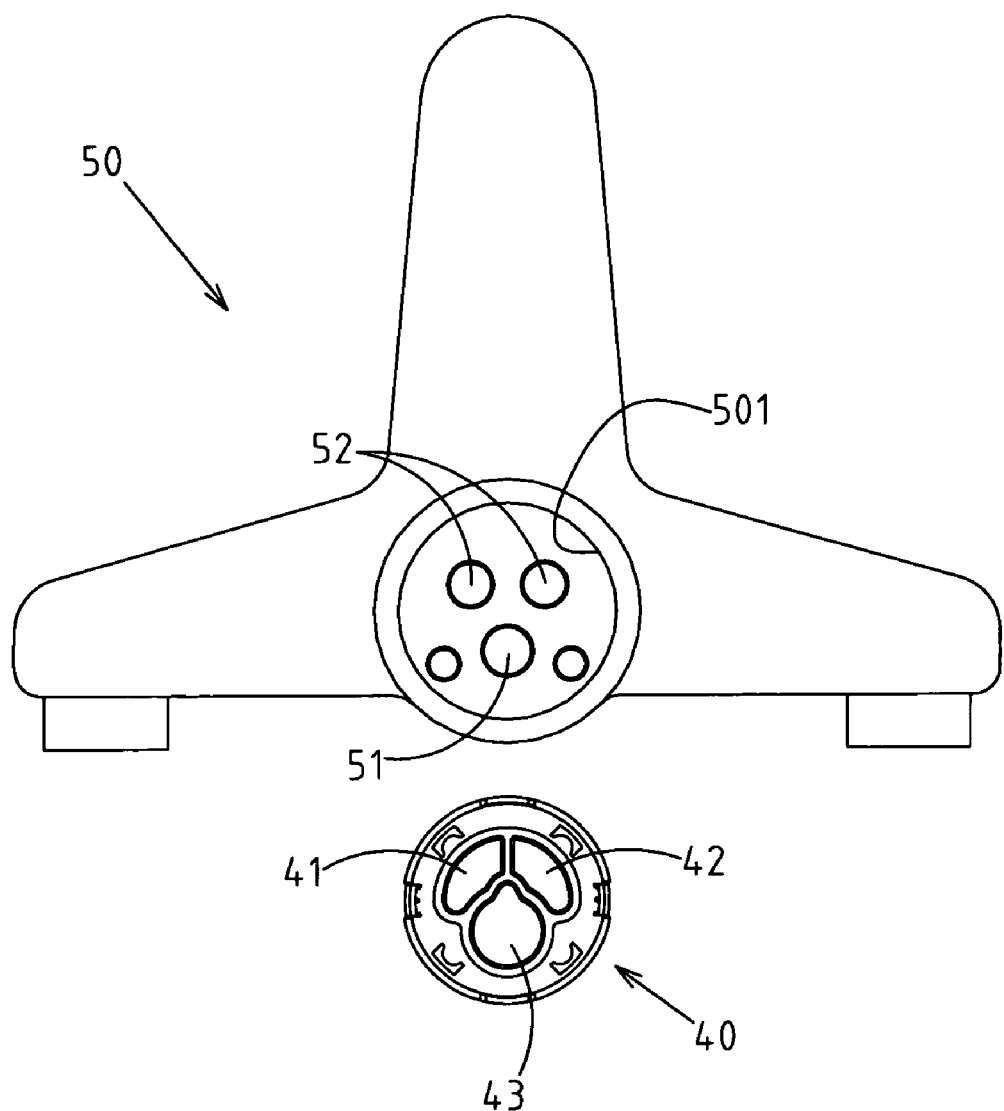
FIG. 7 shows a bottom view of the valve base next to the valve groove holes.
Figure 8:
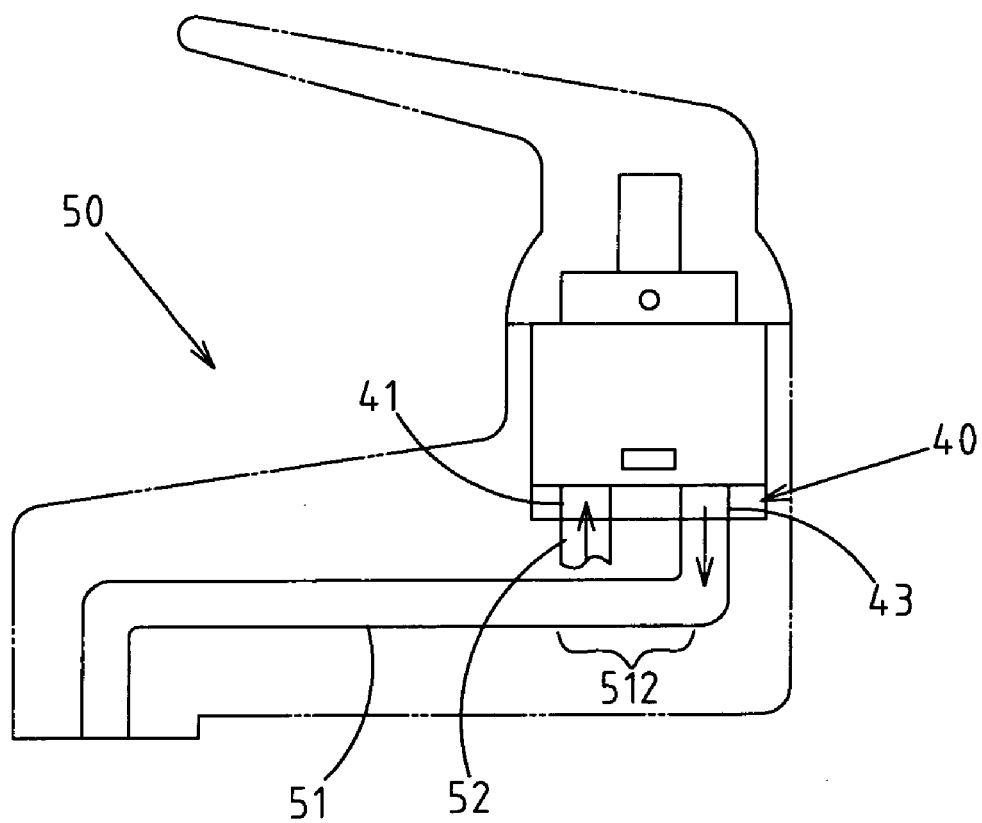
FIG. 8 shows a sectional view of the layout of the inlet and outlet of the valve groove.

As shown in FIGS. 1–6, there is a faucet embodied in the present invention.

There is a water channel of the valve base 10, which includes a cold water inlet 11, a hot water inlet 12, and an outlet 13. In particular, this valve base 10 is installed at the bottom of a valve 20. When the valve is installed in the pre-set valve groove 301 of the faucet 30, the cold and hot water inlets 11 12 and outlet 13 are corresponding with the cold and warm water inlets 31 32 and outlet 33 of the valve groove 301.

The present invention has a horizontal partition membrane 14, which is partially set in the cold and warm water inlets 11 12 and the outlet 13, and reduces their size. Since there is some distance between the partition membrane 14 and the top and the bottom of the inlets as well as outlet, the water would change its running direction.

The reduced cold and warm water inlets 11 12 would come closer to the outlet 13. And the reduced outlet 13 would come closer to the outlet 33 of the valve groove 301 of the faucet 30.

I claim:

1. A faucet with a water inlet and outlet of a valve base comprising:
   a water channel having a cold-water inlet, a warm water inlet, and an outlet; and
   a horizontal partition membrane, partially set in the cold and warm water inlets and the outlet, the partition membrane being placed a distance from a top and a bottom of the inlets and outlet, wherein water has a changeable running direction within said water channel.

2. The faucet defined in claim 1, wherein said reduced cold and warm water inlets are positioned closer to the outlet, when the reduced outlet is positioned closer to the outlet of the valve groove.

* * * * *